United States Patent
Chang et al.

(10) Patent No.: US 7,108,788 B2
(45) Date of Patent: Sep. 19, 2006

(54) ON-SITE TREATMENT METHOD OF FOOD WASTE GENERATED FROM COLLECTIVE RESIDENCE OR INSTITUTIONAL FOOD SERVICE FACILITIES

(75) Inventors: Ho Nam Chang, Seoul (KR); Do-Yun Kim, Seoul (KR); Moon-II Kim, Gwangju (KR); Chul-Hee Ryu, Daejeon (KR); Woo-Gi Lee, Daejeon (KR)

(73) Assignees: E1 Biotech Co., Ltd., Daejeon (KR); Korean Advanced Institute of Science and Technology, Daejeon (KR)

( * ) Notice: Subject to any disclaimer, the term of this patent is extended or adjusted under 35 U.S.C. 154(b) by 48 days.

(21) Appl. No.: 10/487,387

(22) PCT Filed: Aug. 29, 2002

(86) PCT No.: PCT/KR02/01628

§ 371 (c)(1),
(2), (4) Date: Feb. 20, 2004

(87) PCT Pub. No.: WO03/024632

PCT Pub. Date: Mar. 27, 2003

(65) Prior Publication Data

US 2004/0206698 A1    Oct. 21, 2004

(30) Foreign Application Priority Data

Aug. 29, 2001    (KR) ............... 10-2001-0052630

(51) Int. Cl.
*C02F 3/28* (2006.01)
*B09B 3/00* (2006.01)

(52) U.S. Cl. .............. 210/601; 210/173; 210/603; 210/920

(58) Field of Classification Search .............. 210/603, 210/609, 620, 173, 252, 259, 601, 920; 71/11, 71/14; 426/805, 807
See application file for complete search history.

(56) References Cited

U.S. PATENT DOCUMENTS 3,192,154 A * 6/1965 Burton ................. 210/615
3,666,106 A * 5/1972 Green ................. 210/201

(Continued)

FOREIGN PATENT DOCUMENTS

JP    60-222198    * 11/1985

(Continued)

OTHER PUBLICATIONS

Chang, Ho Nam, Biochemical Engineering, p. 576, Daeyoung Co., 1988.

(Continued)

*Primary Examiner*—Fred G. Prince
(74) *Attorney, Agent, or Firm*—Steven J. Hultquist; Intellectual Property Technology Law

(57) ABSTRACT

Disclosed is an on-site treatment method of food waste generated from multi-unit dwellings and institutional food service facilities, by transporting wastewater-containing food waste to a separation chamber by use of domestic wastewater or an additional transporter; separating the transported food waste to wastewater and food waste; and treating the separated wastewater in a sewage disposal plant, and the separated food waste using disposal equipment. Such food waste can be treated even using disposal equipment of small capacities, due to separation of wastewater and food waste, compared to disposal equipment of large capacities required for treating wastewater and food waste together. Also, the quality of the separated wastewater is better than the conventional quality of wastewater, and thus loads of the sewage disposal plant can be efficiently decreased.

2 Claims, 3 Drawing Sheets

U.S. PATENT DOCUMENTS

| | | | |
|---|---|---|---|
| 3,747,766 A * | 7/1973 | Brooks | 210/259 |
| 4,188,289 A * | 2/1980 | Besik | 210/617 |
| 4,190,539 A * | 2/1980 | Besik | 210/195.4 |
| 4,229,202 A * | 10/1980 | Mullerheim et al. | 71/8 |
| 4,342,830 A * | 8/1982 | Holloway | 435/161 |
| 4,812,237 A * | 3/1989 | Cawley et al. | 210/605 |
| 5,114,586 A * | 5/1992 | Humphrey | 210/606 |
| 5,527,464 A * | 6/1996 | Bartha et al. | 210/603 |
| 6,315,903 B1 * | 11/2001 | Noyes | 210/601 |

FOREIGN PATENT DOCUMENTS

| | | | |
|---|---|---|---|
| KR | 98-76572 | * | 11/1998 |
| KR | 1999-46725 A | | 7/1999 |
| KR | 20-0166754 | * | 2/2000 |
| KR | 20-166754 Y1 | | 2/2000 |
| KR | 10-258431 B1 | | 6/2000 |
| KR | 10-0266089 | | 9/2000 |
| KR | 10-0280934 | | 1/2001 |
| WO | WO 92/14539 A1 | | 9/1992 |

OTHER PUBLICATIONS

Park, Jong-Moon, et al., Treatment of Food Waste in Slurry State, Bioresource Technology 73, 21-27, 2000.

* cited by examiner

ON-SITE TREATMENT METHOD OF FOOD WASTE GENERATED FROM COLLECTIVE RESIDENCE OR INSTITUTIONAL FOOD SERVICE FACILITIES

CROSS-REFERENCE TO RELATED APPLICATIONS

This application is filed under the provisions of 35 U.S.C. §371 and claims the priority of International Patent Application No. PCT/KR02/01628 filed Aug. 29, 2002, which in turn claims priority of Korean Patent Application No. 2001-52630 filed Aug. 29, 2001.

TECHNICAL FIELD

The present invention pertains, in general, to treatment methods of food waste, and more particularly, to an on-site treatment method of food waste generated from multi-unit dwellings such as apartment buildings as well as food service facilities in schools, military bases, youth centers, etc., characterized by the separation of liquid and solid constituents of food waste transported to a separation chamber and the disposal of solid food waste using biological treatment equipment or feedstuff-Producing and composting equipment.

BACKGROUND ART

In Korea, food waste corresponding to 8 trillion won every year is generated. Although such food waste may be converted to reusable resources, such treatment is not easy. According to statistical data of Ministry of Environment for the year 2000, food waste reused as feedstuff and compost amounts to 5,600 tons of total food waste of 11,350 tons, such that a reuse ratio of food waste reaches 49.3%.

Generally, since most food waste is composed of organic compounds, problems related to stabilization of soil and leachate may be caused when such waste is buried.

In order to overcome such problems, there are proposed techniques of treating food waste through composting, feedstuff-Producing, and weight reduction of food waste by hot air drying or dehydration. However, the composting techniques are disadvantageous in that unpleasant odors are generated during such composting process, and also, in case of using compost for a considerable time period, effects of a salt content in compost on soils cannot be predicted.

As for feedstuff-Producing methods, when feedstuff is made under poor sanitary conditions, livestock may catch a disease or die of diseases. Thus, such methods are unfavorable because materials unsuitable for use as feedstuff should be thoroughly separated from food waste before the waste is subjected to a feedstuff-Producing process.

The treatment of food waste by hot air drying or dehydration is not regarded as a method of finally treating decomposable organic compounds. Further, in case of large restaurants provided with a weight reduction apparatus, an offensive odor is caused, and an additional apparatus is required to remove such odor. Therefore, excess power is used and operation cost is increased.

In addition, there is a method of degrading the collected food waste via nonaerobic digestion provided, which is applied as a form of a septic tank in a small apartment area and a municipal plant, and its application is increasing.

In this regard, Korean Patent No. 0280934 discloses a simultaneous disposal method of ordure, food waste and domestic sewage. Additionally, Korean Patent No. 0266089 discloses a technique of treating organic compounds, which constitutes of food waste, using aerobic microorganisms, water, air and hydrogen peroxides.

However, the above methods are disadvantageous in that, since the transported food waste is treated together with domestic sewage while not being separated, sewage and food waste cause high loads on a disposal facility, thus requiring a disposal facility of a large capacity.

Food waste, which is generated from homes or restaurants, is accumulated and stored in a separate container for a predetermined time period and then collected before treatment. Therefore, during storage, waste generates a bad smell due to putrefaction, or vermin and bacteria grow therein, and so the surrounding environment is spoiled.

Aiming to overcome the problems encountered in the prior art, we, the inventors of the present invention, have been trying to develop an on-site treatment method of food waste generated from multi-unit dwellings or institutional food service facilities, by transporting such food waste having solid and liquid constituents to a separation chamber as soon as food waste is generated from such waste-creating sources, separating the transported food waste to liquid and solid constituents in the separation chamber, and finally treating the separated solid food waste with the use of disposal equipment.

DISCLOSURE OF THE INVENTION

Therefore, it is an object of the present invention to provide an on-site treatment method of food waste generated from multi-unit dwellings or institutional food service facilities, which is advantageous in terms of disposal of food waste using small disposal equipment due to separation of liquid and solid constituents of food waste, and reduced load of a sewage disposal plant due to good water-quality of the separated liquid constituents.

BEST MODE FOR CARRYING OUT THE INVENTION

In accordance with an aspect of the present invention, there is provided an on-site treatment method of food waste generated from multi-unit dwellings or institutional food service facilities, comprising the following steps of: transporting food waste having solid and liquid constituents to a separation chamber by use of domestic wastewater or additional transportation means, separating the transported food waste to liquid and solid constituents in the separation chamber, and finally treating the separated liquid constituents in a sewage disposal plant and the separated solid food constituents with the use of disposal equipment.

In accordance with another aspect of the present invention, there is provided an on-site treatment method of food waste generated from multi-unit dwellings or institutional food service facilities, comprising the following steps of: grinding food waste having solid and liquid constituents; transporting the ground food waste to a separation chamber by use of domestic wastewater or additional transportation means, separating the transported food waste to liquid and solid constituents in the separation chamber, and separately treating the separated liquid constituents in a sewage disposal plant and the separated solid food waste with the use of disposal equipment.

Since food waste typically includes liquid components and also serving vessels after a meal are washed with water, food waste generated from multi-unit dwellings and institutional food service facilities basically contain a predetermined amount of dirty liquid constituents, that is to say, wastewater.

Accordingly, in the present invention, food waste generated from such waste-creating sources, which contain a predetermined amount of wastewater, are referred to as wastewater-containing food waste.

A separation chamber of the present invention is provided to separate wastewater-containing food waste into liquid and solid constituents, for instance, wastewater and food waste, in which separation may be carried out in any manner as long as wastewater and solid food waste are separated. The separation chamber may operate according to the methods selected from precipitation separation, centrifugal separation, sieving, twin gear juicer separation, microfiltration, ultrafiltration, nanofiltration, reverse osmosis, and combination thereof. Among them, the manner of sieving and/or twin gear juicer separation may be preferably adopted.

Disposal equipment used in a final treatment step of the present invention is a means for treating solid foods separated in the separation chamber. The usable disposal equipment comprises general food waste-treating equipment, for example, bioreactors, anaerobic digestion tanks, composting equipment or feedstuff-Producing equipment. Among them, a bioreactor or anaerobic digestion tank is preferably used.

Figure 1:
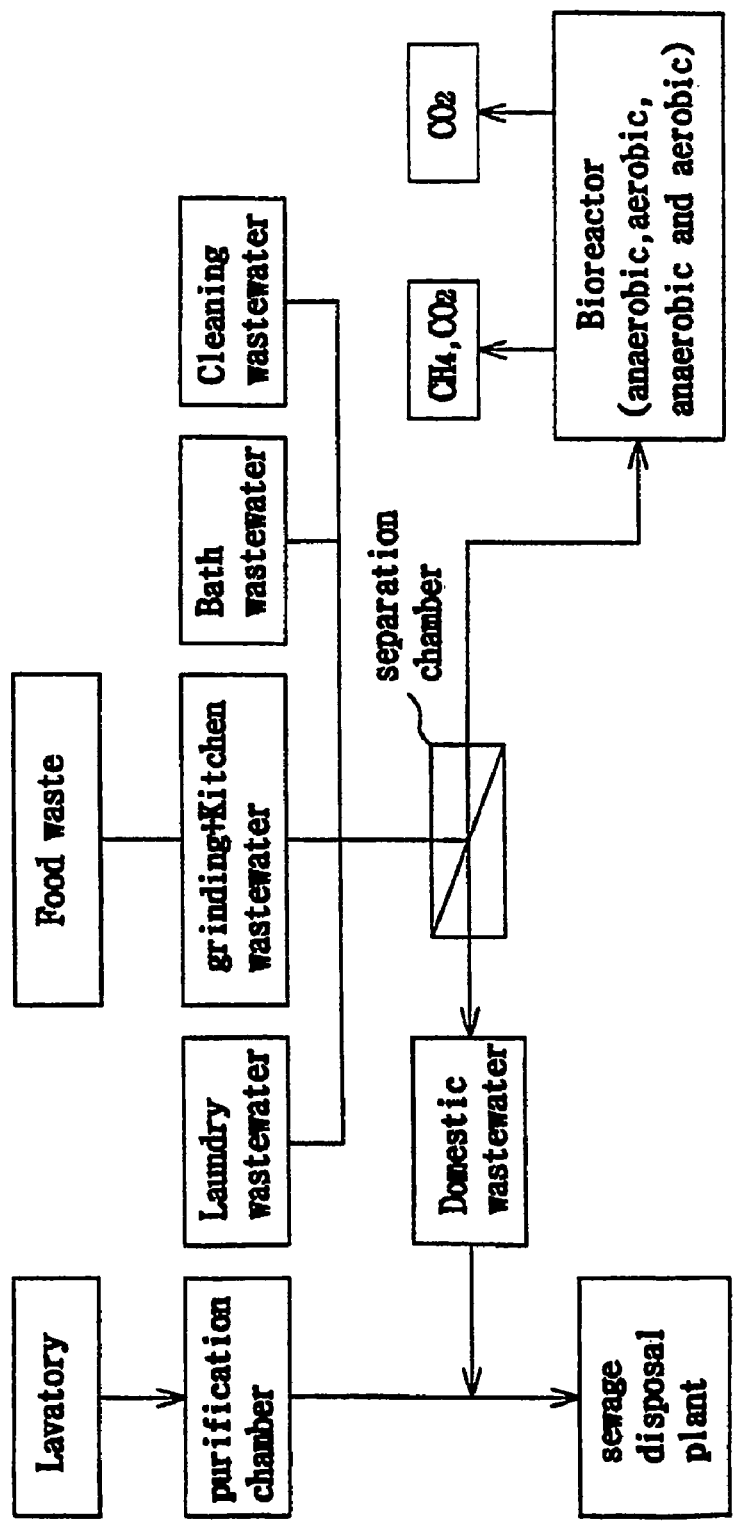
FIG. 1 is a block diagram showing a treatment process of food waste according to the present invention.

Referring to FIG. 1, there is shown a disposal process of food waste according to the present invention.

When food waste having liquid and solid constituents is generated from multi-unit dwellings or institutional food service facilities, such food waste is transported to the separation chamber with the use of domestic wastewater or transportation means, and separated into liquid and solid constituents, respectively. Then, the separated liquid constituents are discharged to a sewage disposal plant, along with the lavatory wastewater. On the other hand, the separated solid foods may be transported to a disposal equipment and finally treated therein.

Moreover, wastewater-containing food waste may be ground using a grinding machine, before being transported to the separation chamber.

Since large lumps of solid foods in food waste are difficult to transport together with domestic wastewater and further may clog a transfer route, the grinding machine, which is mounted to the transfer route of food waste such as in the drain opening of a sink in order to grind large lumps of solid foods, allows easy transportation of large volumes of food-containing waste with domestic wastewater.

Any grinding machines can be used as long as food waste may be ground together with water. The above-mentioned grinding machine has been already mounted to kitchen fixtures in advanced countries, such as USA.

In order to transport the wastewater-containing food waste to the separation chamber, additional transportation means can be used, such as a screw transporter, or domestic wastewater created from food waste-generating sources including homes, restaurants and food service facilities, for instance, kitchen wastewater, bath wastewater, dishwater, cleaning wastewater, and laundry wastewater. Thereby, the screw transporter means is preferably used in large restaurants, hospitals and military bases, meanwhile domestic wastewater is used for homes with relatively small amounts of food waste.

When the wastewater-containing food waste is transported by domestic wastewater, laundry wastewater containing chemical materials, such as detergents, and lavatory wastewater are excluded from domestic wastewater, depending on final reuse purposes of the transported food waste.

The reason why such laundry wastewater including chemical materials and lavatory wastewater are excluded is that food waste may be recycled as feedstuff or compost after being subjected to feedstuff-Producing processes or composting processes.

Further, when domestic wastewater used for transportation of the wastewater-containing food waste to the separation chamber is combined with such food waste, soluble BOD of food waste to be disposed becomes higher. Increase of soluble BOD of food waste leads to decreased disposal efficiency of food waste. Thus, in the separation chamber, all liquid constituents including wastewater in food waste as well as domestic wastewater transported with food waste must be thoroughly separated from solid foods.

At a final treatment step using the disposal equipment, solid food waste separated in the separation chamber are treated. As the disposal equipment, a bioreactor, an anaerobic digestion tank, a composting equipment or a feedstuff-Producing equipment.

As for the bioreactor, solid food waste is charged to a reaction bath under anaerobic and/or aerobic conditions, decomposed by microorganisms growing in anaerobic and/or aerobic conditions, and converted to water and gas such as methane gas ($CH_4$) or carbon dioxide. Meanwhile, the generated methane gas can be collected for a predetermined time period and may be used as an energy source.

According to the type of food waste, the bioreactor is provided with an aerobic or anaerobic reaction bath. In some cases, both anaerobic and aerobic baths may be used.

In the anaerobic reaction bath, food waste is decomposed using microorganisms under an anoxia condition, while food waste is decomposed with the use of microorganisms under an aerobic condition in the aerobic bath.

Anaerobic digestion using the anaerobic digestion tank means a manner of fermenting food waste while not feeding oxygen thereto. In case where food waste is subjected to anaerobic digestion, foods are decomposed to sugar, which is converted to acids, such as acetic acid, propionic acid, butyric acid and the like, followed by further converting such acids to methane gas and carbonic acid gas. Thereby, foods are thoroughly decomposed.

During the anaerobic conditions used in the bioreactor, food waste is decomposed in similar conditions as in the anaerobic digestion. However, because food waste is treated in shorter time period upon use of the bioreactor under anaerobic conditions, foods are not thoroughly decomposed and residues remain.

Further, solid foods separated in the separation chamber are subjected to feedstuff-Producing and composting treatment processes and can be reused as nutritive sources for livestock or crops.

A description will be given of various disposal methods of food waste according to the present invention.

Disposal Method of Food Waste Generated from Apartment Areas

A 90-household apartment building in Seoul has total residents of about 315, considering 3.5 persons per household. Daily food waste created from such building totaled about 63 kg, averaging about 0.2 kg/day/person.

Daily used tap water, containing warm water and cold water, amounts to about 80 m³/day, which corresponds to about 900 L/day per household. Tap water is used in lavatories, kitchens, and for bathing, laundry and house cleaning. After use, lavatory wastewater is separately transported to a septic tank, and kitchen wastewater, laundry wastewater, cleaning wastewater and bath wastewater are combined and discarded, or are mixed with lavatory wastewater through the septic tank and discharged to sewage disposal plants.

At present, food waste generated from apartment areas is accumulated in a garbage bin, collected 2 or 3 times per week into a reservoir tank in the apartment area, and transported to a common disposal facility.

For transporting food waste to the disposal facility, food waste after grinding in kitchens is discharged along with kitchen wastewater, and further transported to a common disposal facility in an apartment basement, by use of domestic wastewater, with the exception of lavatory wastewater. If the quality of the separated domestic wastewater is worse than that of wastewater before transportation to the separation chamber, it is raised to a predetermined quality level through simple biological treatment. Meanwhile, if the quality is better than the above case, wastewater is directly discharged to the outside.

The separated food waste is converted to methane and carbon dioxide, or carbon dioxide and water with high efficiency anaerobic or aerobic fermentation bath, and degraded, by common-known methods.

Transporting and Separating Methods of Food Waste

As for food waste delivered together with kitchen wastewater or domestic wastewater including bath wastewater, laundry wastewater and cleaning wastewater as well as kitchen wastewater, such food waste is diluted about 1,000 times (80000 L×0.85/63 L), when water used in toilet flushing amounts to 15% of total water used in apartment areas per day.

In the case of using kitchen wastewater, when water used in the kitchen corresponds to 25% of total water used in an apartment area per day, food water is diluted 250 times. In the case of domestic wastewater, an average flow rate is about 47 L/min. Even if a maximal flow rate is approximately twice the average flow rate, that is to say, about 100 L/min, such a maximal flow rate is not so high, a recovery efficiency of food waste can be increased by control of mesh size in the separator.

In this regard, 20 g of food waste is diluted 1000 times with 20 L of water, and separated using a kitchen mesh. Thereby, the recovery efficiency reaches about 65–90 wt %.

As mentioned above, by decreasing the size of the mesh, which is the simplest separator, the recovery efficiency of food waste can be further increased.

Disposal Method of Food Waste Generated from Food Service Facilities

As for food service facilities in schools or military bases, generation of most food waste is concentrated locally. Therefore, food waste can be easily transported to the terminal disposal equipment using a screw-mounted pipes. With the aim of increasing the disposal rate of such equipment, the grinding machine is located in front of the terminal disposal equipment.

Volume of Anaerobic or Aerobic Reaction Bath

In residential buildings such as apartments, or food service facilities in schools and military bases, disposal equipment of food waste should be small in volume, and should treat such waste in-situ.

In the following example section of the present invention, a facility accommodating 1000 persons or fewer is set as the treatment target, from which totally generated food waste amounts to about 200 kg/day.

In the case of the above stated apartment having 315 residents, food waste is generated in the amount of about 63 kg/day. When such waste is treated at 36° C. under anaerobic condition, the disposed amount per unit reactor volume is 1.6 to 6.4 kg/m³·day based on dry weight of food waste [Chang Ho-Nam, Biochemical Engineering, p576, Daeyoung Co., 1988]. When the water content in the food waste is assumed to be about 80%, an anaerobic reactor required to dispose of about 12.6 kg based on dry weight of food waste has a volume of 1.9–7.8 m³. The most preferable reactor volume is about 4.2 m³. On the other hand, when food waste is treated by an aerobic method using air at room temperature, the amount of such waste to be disposed of is 3 kg/m³·day and the reactor volume is only 4.2 m³ [Park Jong-Moon et al., Treatment of Food Waste in Slurry State, Bioresource Tech. 73, 21–27, 2000]

In consideration of reactor volume required for anaerobic and aerobic treatment as well as basement space of an apartment building, the above reactors used in the anaerobic and the aerobic treatments can be sufficiently provided in the basement of the apartment.

As for dining halls of Korea Advanced Institute of Science and Technology (KAIST), the reactor volume is 3.1–12.3 m³ in the anaerobic treatment stage, and 6.6 m³ in the aerobic treatment stage, for disposing of 40 kg based on dry weight of food waste. Thus, the reactor can be provided nearby the dining halls.

Water-Quality after Treatment Methane Gas and Odor Problems

In the present invention, apartment wastewater will be maintained at the water quality level of liquid constituents after separation of liquid and solid constituents of food waste. Prior to such separation processes performed in the separation chamber for on-site treatment of food waste, BOD of wastewater, which is classified into soluble BOD and particulate BOD, is further increased upon addition of food waste due to soluble BOD and particulate BOD of food waste.

But, particulate BOD is removed by filtration, and thus water quality after treatment is the same or superior to that before treatment.

Figure 3:
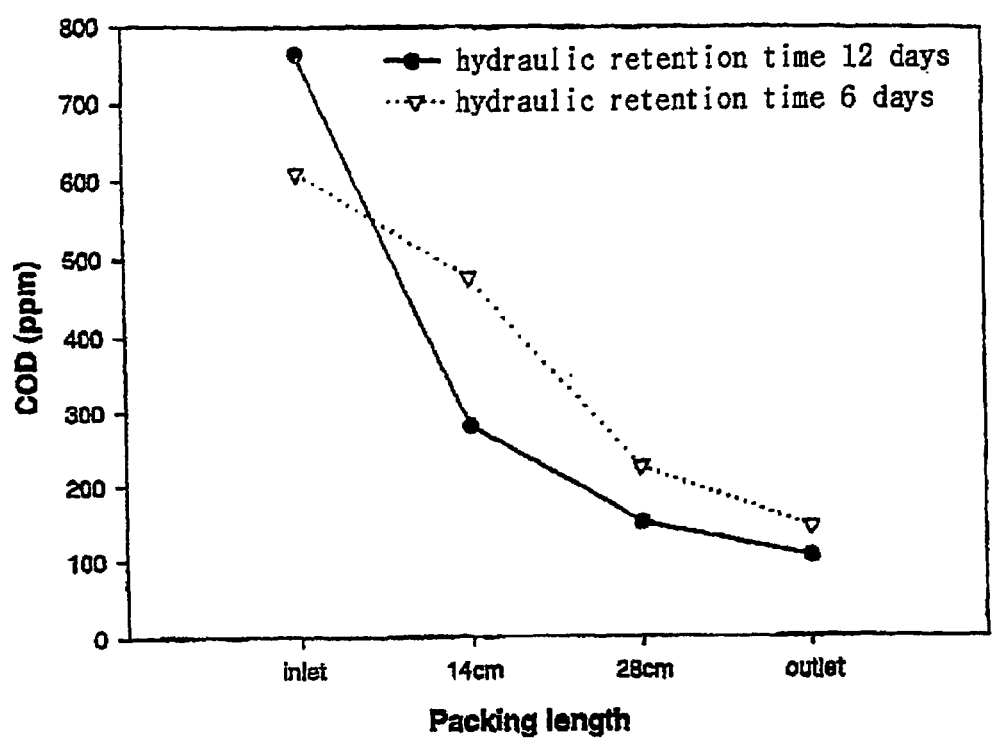
FIG. 3 is a graph showing water quality after treatment of food waste according to the present invention.

The volume of water after the anaerobic digestion is generated approximately equal to the amount of daily treated food waste (92% when water content is 80%). Water after treatment has a BOD in the range of from several thousands of ppm to several hundreds of ppm, depending on the treatment methods. However, if the treatment methods, such as a packed tower, are selected properly, BOD can be maintained close to 100 ppm (FIG. 3).

Since offensive odor upon generation of the methane gas is caused by the organic acids, it may be controlled by removal of the organic acids. Odor problems attributed to anaerobic or aerobic treatment can be treated with the current odor-treatment technology.

A better understanding of the present invention may be obtained in light of the following examples which are set forth to illustrate, but are not to be construed to limit the present invention.

EXAMPLE 1

To an anaerobic digestion reactor made of iron and having a volume of 2 L, food waste generated from dining halls of KAIST used daily by 1000 persons was charged in the amount of 2 g/L by dry weight.

The pH in the reactor was adjusted to 7.65 using NaOH, and the temperature was raised to 35° C., followed by sealing the reactor and forming a nonaerobic atmosphere therein.

The pH in the reactor was determined by a pH meter and the generated methane gas amount was measured with the use of a gas meter.

The results are given in Table 1, below.

EXAMPLE 2

The present example was performed in the same manner as in the above Example 1, except that food waste was charged to the above reactor in the amount of 5 g/L, instead of 2 g/L, on the basis of dry weight.

The results are presented in Table 1, below.

EXAMPLE 3

The present example was performed in the same manner as in the above Example 1, except that food waste was charged to the above reactor in the amount of 10 g/L, instead of 2 g/L, on the basis of dry weight.

The results are presented in Table 1, below.

EXAMPLE 4

The present example was performed in the same manner as in the above Example 1, except that food waste was charged to the above reactor in the amount of 20 g/L, instead of 2 g/L, on the basis of dry weight.

The results are presented in Table 1 and FIG. 2, below.

TABLE 1

| Example. No. | 1 | 2 | 3 | 4 |
|---|---|---|---|---|
| Initial pH | 7.65 | 7.65 | 7.65 | 7.65 |
| Post-reaction pH | 7.65 | 7.65 | 7.65 | 7.65 |
| Generated methane gas (mL/g) | 400 | 380 | 350 | 320 |

Figure 2:
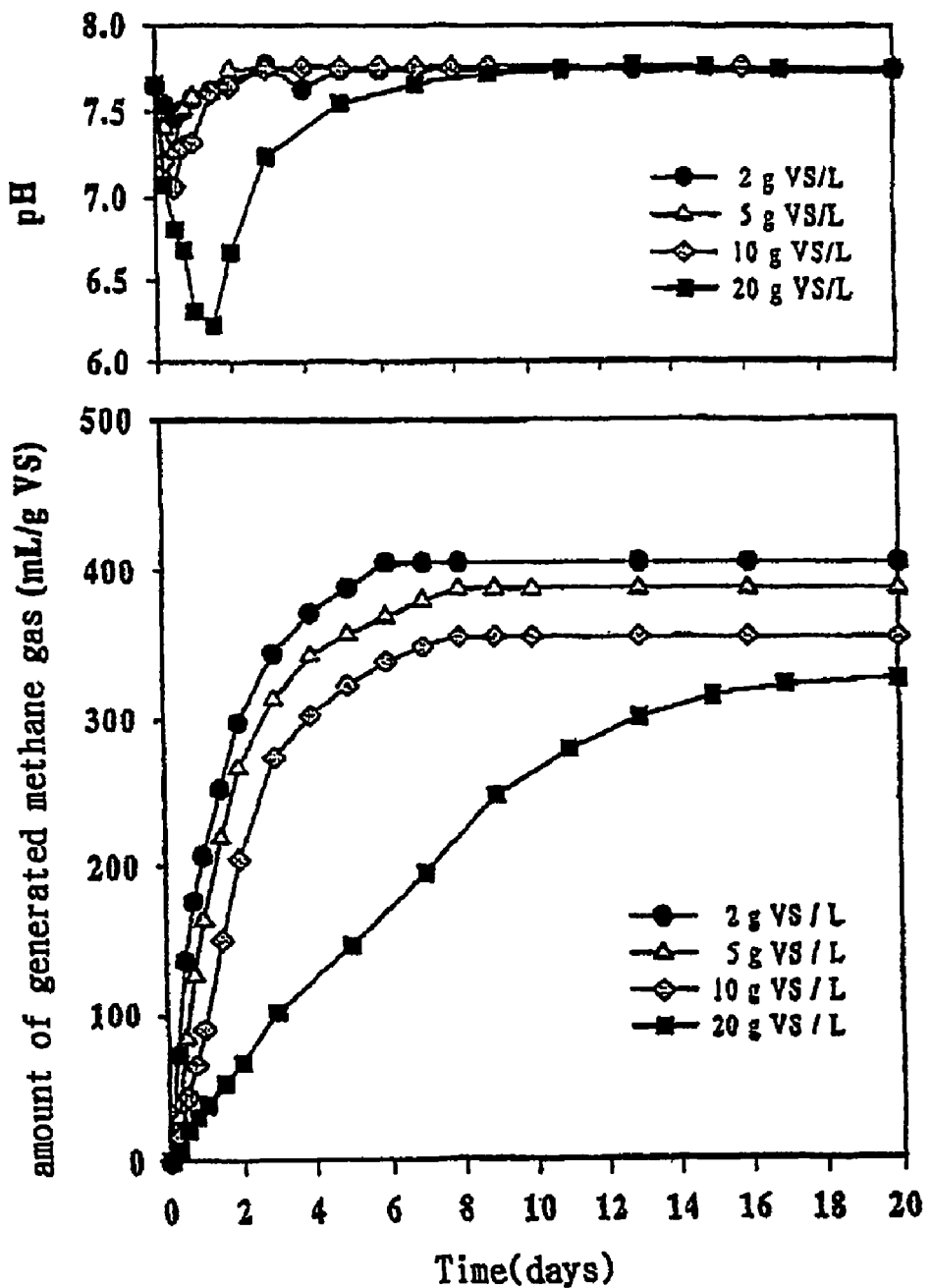
FIG. 2 is a graph showing the amount of generated methane gas and pH change according to the disposal process of food waste of the present invention.

From the above Table 1 and FIG. 2, it could be seen that the initial pH is similar to the pH after the anaerobic digestion, and the food waste could be sufficiently decomposed in view of the generated methane gas, even though the amount of the food waste charged to the anaerobic digestion reactor was increased to 20 g/L by dry weight.

EXAMPLE 5

Wastewater and food waste combined together, discharged from a kitchen in a general household, were transported to a separation chamber containing meshes, after which combined wastewater and food waste was separated to liquid and solid constituents in the separation chamber.

Wastewater before and after the separation was measured for COD thereof, and the change of water quality according to the transportation and the separation of food waste is shown in the following Table 2.

TABLE 2

Change of Water Quality by Transportation and Separation of Food Waste

| | Water Quality | Domestic wastewater | Domestic wastewater and Food Waste |
|---|---|---|---|
| Before SS separation | COD (mg/L) | 4050 | 6000 |
| | SS (mg/L) | 755 | 1440 |
| After SS separation | COD (mg/L) | 2400 | 2050 |

Note:
SS means floating matter and food waste contained in domestic wastewater

The term "domestic wastewater and food waste" means that food waste was diluted 250 times with domestic wastewater (KAIST East dining hall).

As shown in the above Table 2, COD of kitchen wastewater was 4050 mg/L, and COD of wastewater after separation of food waste was 2050 mg/L. From this, it could be seen that water quality after separation was better than before the separation, and an additional wastewater treatment was not needed.

INDUSTRIAL APPLICABILITY

According to the on-site treatment method of food waste generated from food waste-creating sources including households or restaurants of the present invention, wastewater-containing food waste is transported to a disposal place, immediately after such waste accumulated in a separate place for a predetermined time period is collected. Hence, problems related to offensive odor due to putrefaction of food waste, vermin and bacterial growth and spoiled environment, attributable to accumulation of food waste, can be effectively solved.

Further, in the present invention, wastewater-containing food waste is separated into liquid and solid constituents, respectively, after which the separated liquid constituents flow into a sewage disposal plant, and the separated solids are disposed of using an additional disposal equipment. A disposal equipment of relatively small capacity can treat food waste because of separation of food waste, compared to conventional disposal equipment of large capacity required for treatment of wastewater and food waste together. Also, the water quality of the separated liquid constituents, which flows into the sewage disposal plant, is better than the conventional qualitiy of wastewater before separation, and thus loads of the sewage disposal plant can be significantly decreased.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. An on-site treatment method of food waste generated from multi-unit dwelling and institutional food service facilities, comprising the following steps of:
    grinding such food waste by use of a grinding machine equipped under a kitchen sink, and transporting the ground food waste to a filtration chamber for separating in front of an anaerobic bioreactor, wherein the transporting is performed by use of kitchen wastewater;

separating the transported food waste and kitchen wastewater by use of the filtration chamber; and finally discharging the separated kitchen wastewater to a existing sewage disposal plant without any additional treatment and treating the food waste separated from wastewater in the anaerobic bioreactor.

2. The method as set forth in claim 1, wherein the filtration chamber for separating comprises a microfiltration, a ultrafiltration, a nanofiltration, a reverse osmosis, or combinations thereof.

* * * * *

UNITED STATES PATENT AND TRADEMARK OFFICE
CERTIFICATE OF CORRECTION

PATENT NO.         : 7,108,788 B2
APPLICATION NO. : 10/487387
DATED                 : September 19, 2006
INVENTOR(S)       : Ho Nam Chang et al.

It is certified that error appears in the above-identified patent and that said Letters Patent is hereby corrected as shown below:

In the Title page, first column, in the identification of inventors, Item [75], "Moon-II Kim" should be -- Moon-Il Kim --.

In the Title page, first column, in the identification of Assignees, Item [73], "Korean Advanced Institute of Science and Technology" should be -- Korea Advanced Institute of Science and Technology --

Signed and Sealed this

Ninth Day of January, 2007

JON W. DUDAS
*Director of the United States Patent and Trademark Office*